United States Patent
Velke et al.

(10) Patent No.: US 7,428,884 B2
(45) Date of Patent: Sep. 30, 2008

(54) MOWER HYDRAULIC TANK COOLING BAFFLE POSITIONED ABOVE ENGINE FLYWHEEL

(75) Inventors: James D. Velke, Germantown, MD (US); William R. Wright, Clarksburg, MD (US); Luke Waesche, Hagerstown, MD (US)

(73) Assignee: Wright Manufacturing, Inc., Frederick, MD (US)

( * ) Notice: Subject to any disclaimer, the term of this patent is extended or adjusted under 35 U.S.C. 154(b) by 478 days.

(21) Appl. No.: 11/208,011

(22) Filed: Aug. 22, 2005

(65) Prior Publication Data

US 2007/0039302 A1 Feb. 22, 2007

(51) Int. Cl.
*F01P 7/10* (2006.01)
(52) U.S. Cl. .................................. 123/41.48; 180/68.1
(58) Field of Classification Search .............. 123/41.48, 123/41.49, 41.54, 41.58, 41.55, 41.01; 180/68.1, 180/6.3; 172/449, 680, 776; 165/51, 41; 56/11.9
See application file for complete search history.

(56) References Cited

U.S. PATENT DOCUMENTS

| | | | | |
|---|---|---|---|---|
| 4,696,361 A | * | 9/1987 | Clark et al. ................ | 180/68.4 |
| 4,920,733 A | | 5/1990 | Berrios | |
| 5,234,051 A | * | 8/1993 | Weizenburger et al. ....... | 165/41 |
| 5,251,429 A | | 10/1993 | Minato et al. | |
| 5,816,033 A | | 10/1998 | Busboom et al. | |
| 5,822,961 A | | 10/1998 | Busboom | |
| 5,964,082 A | | 10/1999 | Wright et al. | |
| 6,129,056 A | * | 10/2000 | Skeel et al. ............... | 123/41.49 |
| 6,138,446 A | | 10/2000 | Velke et al. | |
| 6,189,304 B1 | | 2/2001 | Velke et al. | |
| 6,276,486 B1 | | 8/2001 | Velke et al. | |
| 6,341,479 B1 | | 1/2002 | Scag et al. | |
| 6,390,225 B2 | | 5/2002 | Velke et al. | |
| 6,408,969 B1 | * | 6/2002 | Lobert et al. ................ | 180/68.1 |
| 6,435,144 B1 | * | 8/2002 | Dicke et al. ............... | 123/41.12 |
| 6,438,930 B1 | | 8/2002 | Velke et al. | |
| 6,438,931 B1 | | 8/2002 | Velke et al. | |
| 6,490,849 B1 | | 12/2002 | Scag et al. | |
| 6,560,952 B2 | | 5/2003 | Velke et al. | |
| 6,658,831 B2 | | 12/2003 | Velke et al. | |
| 6,688,089 B2 | | 2/2004 | Velke et al. | |
| 6,701,825 B1 | | 3/2004 | Langenfeld | |
| 6,782,797 B1 | | 8/2004 | Brandenburg et al. | |
| 6,912,831 B2 | | 7/2005 | Velke et al. | |
| 7,146,810 B1 | * | 12/2006 | Hauser et al. .................. | 60/486 |
| 2001/0001170 A1 | | 5/2001 | Velke et al. | |
| 2001/0054445 A1 | * | 12/2001 | Evanovich et al. .......... | 137/574 |
| 2002/0059788 A1 | | 5/2002 | Velke et al. | |
| 2002/0178709 A1 | | 12/2002 | Velke et al. | |
| 2005/0126146 A1 | | 6/2005 | Velke et al. | |
| 2006/0225927 A1 | * | 10/2006 | Iwaki et al. .................. | 180/6.3 |
| 2007/0199293 A1 | * | 8/2007 | Barnett ....................... | 56/11.9 |

* cited by examiner

*Primary Examiner*—Árpád Fábián-Kováacs
(74) *Attorney, Agent, or Firm*—Nixon & Vanderhye P.C.

(57) ABSTRACT

This invention relates to a lawn mower. In certain example embodiments, the lawn mower includes one or more of: (a) a cooling baffle for efficiently cooling a hydraulic fluid tank and/or fluid therein using air flow caused by a combustion engine used for driving mower cutting blade(s); (b) improved cockpit structure including fenders; (c) improved drive wheel (s) adjustment structure or assembly; (d) improved idler arm assembly for use in connection with the cutter deck and/or pump driving belt; and/or (e) improved hose routing structure.

10 Claims, 12 Drawing Sheets

MOWER HYDRAULIC TANK COOLING BAFFLE POSITIONED ABOVE ENGINE FLYWHEEL

This invention relates to a lawn mower. In certain example embodiments of this invention, the lawn mower includes one or more of: (a) a cooling baffle for efficiently cooling a hydraulic fluid tank using air flow caused by a combustion engine used for driving cutting blade(s); (b) improved cockpit structure including fenders; (c) improved drive wheel(s) adjustment structure or assembly; (d) improved idler arm assembly for use in connection with the cutter deck and/or pump driving belt; and/or (e) improved hose routing structure.

BACKGROUND OF THE INVENTION

Lawn mowers are known in the art. For example, stand-on mowers are discussed in U.S. Pat. Nos. 6,138,446, 6,390,225, 6,189,304, 6,438,930, 6,658,831, 6,560,952, and 5,964,082, the disclosures of all of which are all hereby incorporated herein by reference. Example walk-behind lawn mowers are discussed in U.S. Patent Documents 2005/0126146 and U.S. Pat. No. 4,920,733, the disclosures of which are all hereby incorporated herein by reference. Example mower operable by seated occupants are discussed in U.S. Patent Documents 2001/0001170, 2002/0059788, U.S. Pat. Nos. 6,438,930, 6,658,831, and 6,560,952, the disclosures of which are all hereby incorporated herein by reference.

FIGS. 1-4 illustrates different features of an example commercial mower, found in U.S. Pat. No. 6,138,446. The mower includes cutter deck 1, engine deck 3, a pair of front castor wheels 5, a pair of rear drive wheels 7, thigh pad 13 for permitting the operator to rest his/her thighs thereon during operation, support assembly 15 extending upwardly at an angle from engine deck 3 so as to support thigh pad 13 and handle control assembly 11, combustion engine 9, and operator support platform structure 18 which includes pivotal platform sheet 234 for supporting feet of an operator during mower operation. The handle control assembly 11 includes rigid handle bar 10 fixedly attached to supports 15, reverse control levers 17, and forward control levers 19. Control levers 17 and 19 are pivotally affixed to supports 15 about axis 21 so that the standing operator can control the steering of the mower via the rear drive wheels 7 by pivoting levers 17 and/or 19 during operation. The mower is of the zero radius turning type in certain example embodiments, with the wheels being hydraulically driven.

Hydraulically driven (i.e., hydrostatically controlled) mowers include a pair of drive wheels, each of which is independently operated by a hydraulic (i.e., hydrostatic) pump coupled to the mower's engine. A corresponding motor is provided for each drive wheel, each motor being powered and controlled by one of the hydro pumps. Each pump typically includes a control lever for regulating fluid pressure and direction to its corresponding motor so that the drive wheels can be independently controlled so that each may be rotated at variable speeds in both forward and reverse directions. In this manner, the mower may be steered by controlling the speed and direction of the two drive wheels, and may be referred to as a zero radius turning mower. Zero radius turns are typically performed when the two wheels are operated at approximately the same speed but in opposite directions so that the mower pivots or turns about a vertical axis extending upwardly from a location between the drive wheels. In the FIG. 1-4 mower, the hydraulically controlled drive wheels 7 are considered rear drive wheels.

Figure 1:
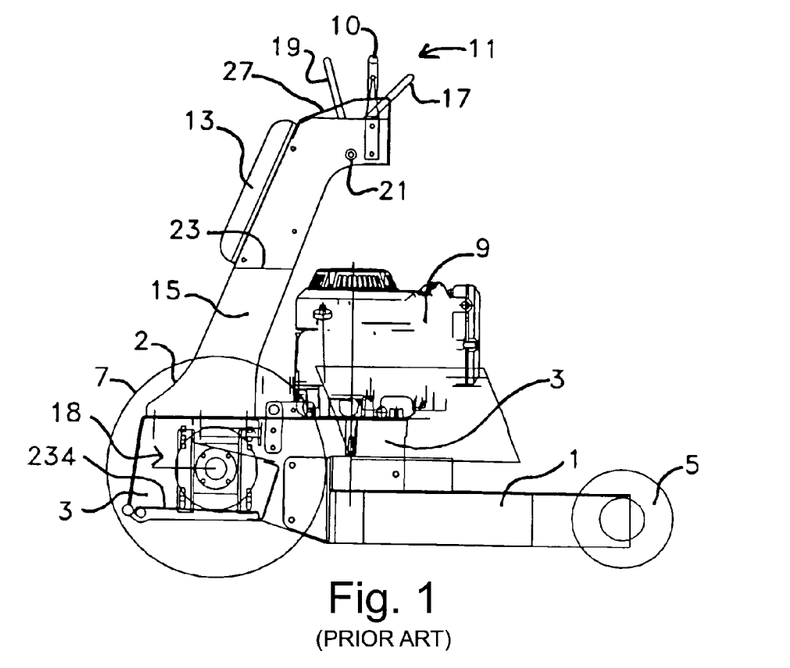
FIG. 1 is a side view of a conventional stand-on lawn mower.
Figure 2:
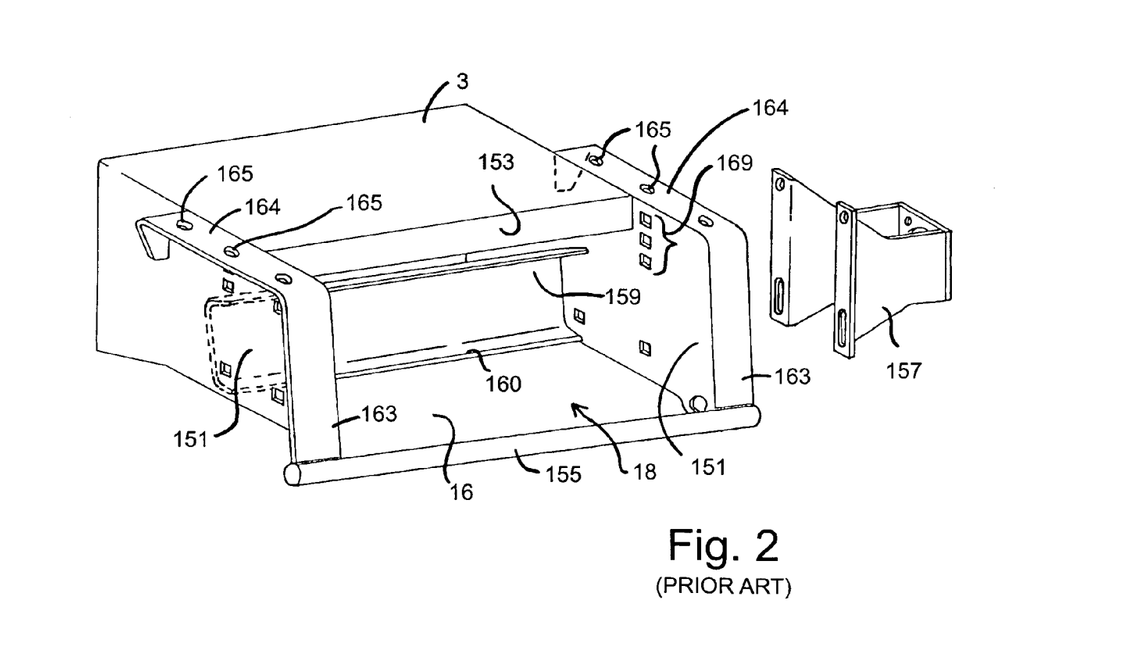
FIG. 2 is a partially exploded elevational view of a conventional engine deck structure and operator support structure of the mower of FIG. 1.

FIG. 2 illustrates standing platform supporting structure (with certain exceptions such as support sheet 234) shown generally by reference numeral 18. The supporting structure 18 includes support sheet 234 for supporting an operator's feet during mower operation, sidewalls 151 for isolating the operator's feet from the drive wheels 7 and their motors, vertical surface 153, elongated annular bar 155 welded to the platform structure so as to give structure for wheel motor brackets 157 on both sides of the platform, a pair of motor brackets 157, rigid channel shaped member 159 disposed between sidewalls 151, a rest 160 for the front of the standing platform, handlebar upright base members 163, via holes 165 for attachment purposes, support surface 164, and mounting holes 169 provided on each sidewall for permitting wheel motor brackets 157 to be affixed to the sidewalls.

Figure 3A:
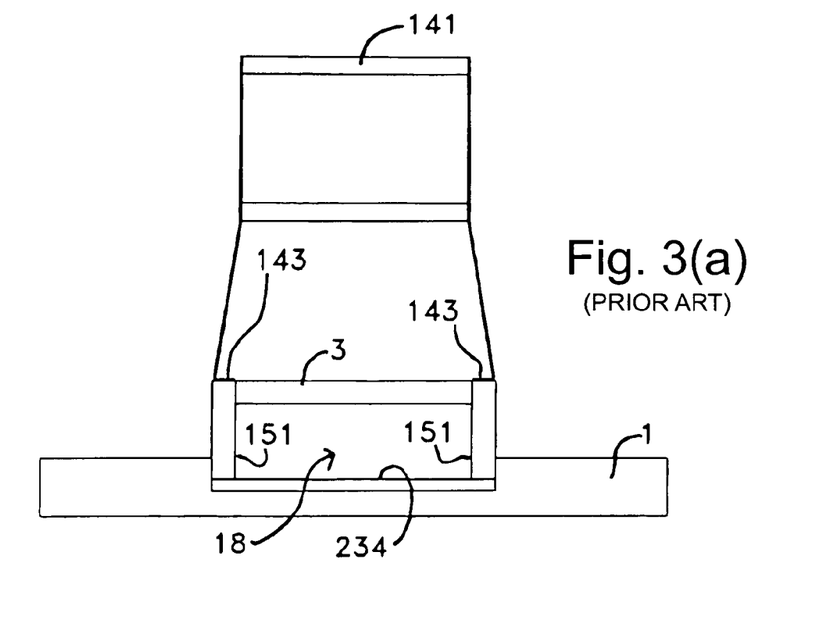
FIG. 3(a) is a rear elevational view of the conventional handle mechanism assembly and engine deck structure of FIG. 1.
Figure 3B:
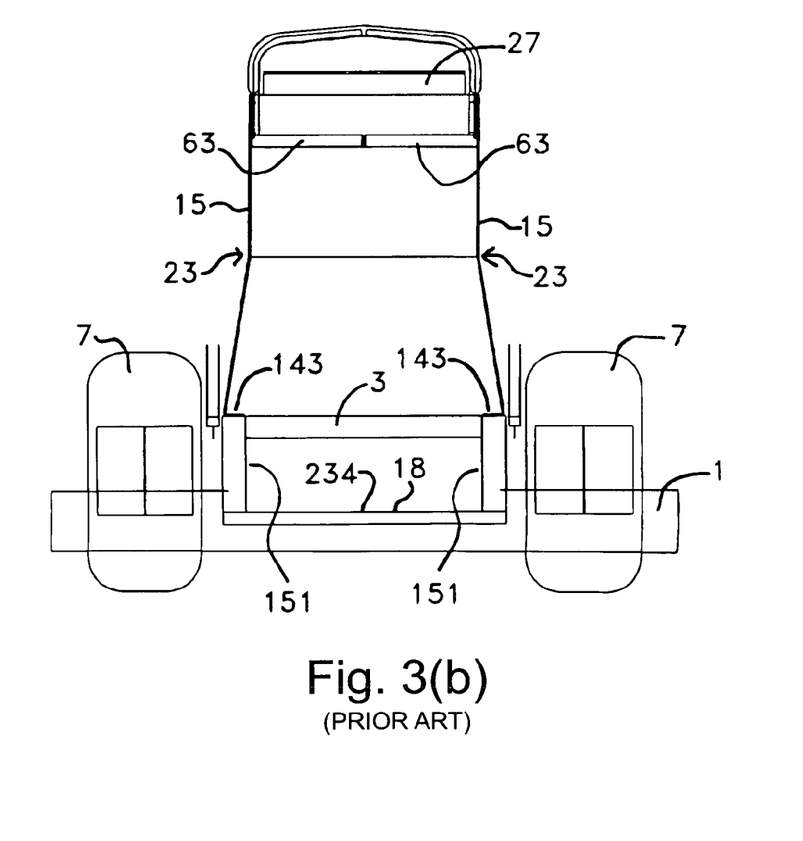
FIG. 3(b) is a rear elevational view of the handle mechanism assembly and engine deck structure of the FIGS. 1 and 3(a) mower, with the rear wheel assembly, dash, and handle bars having been added compared to FIG. 3(a).

FIGS. 3(a)-3(b) illustrate the handle bar support assembly and other items from the rear of the mower. The assembly includes sheet metal supports 15 on either side of the mower, central bends 23 in supports 15, dash panel 27, pivots 63, bend sections 143 at the bottom areas of supports 15 for bolting supports 15 to the engine deck, cutter deck 1, operator foot platform 18, rear drive wheels 7, and platform sidewalls 151.

Figure 4:
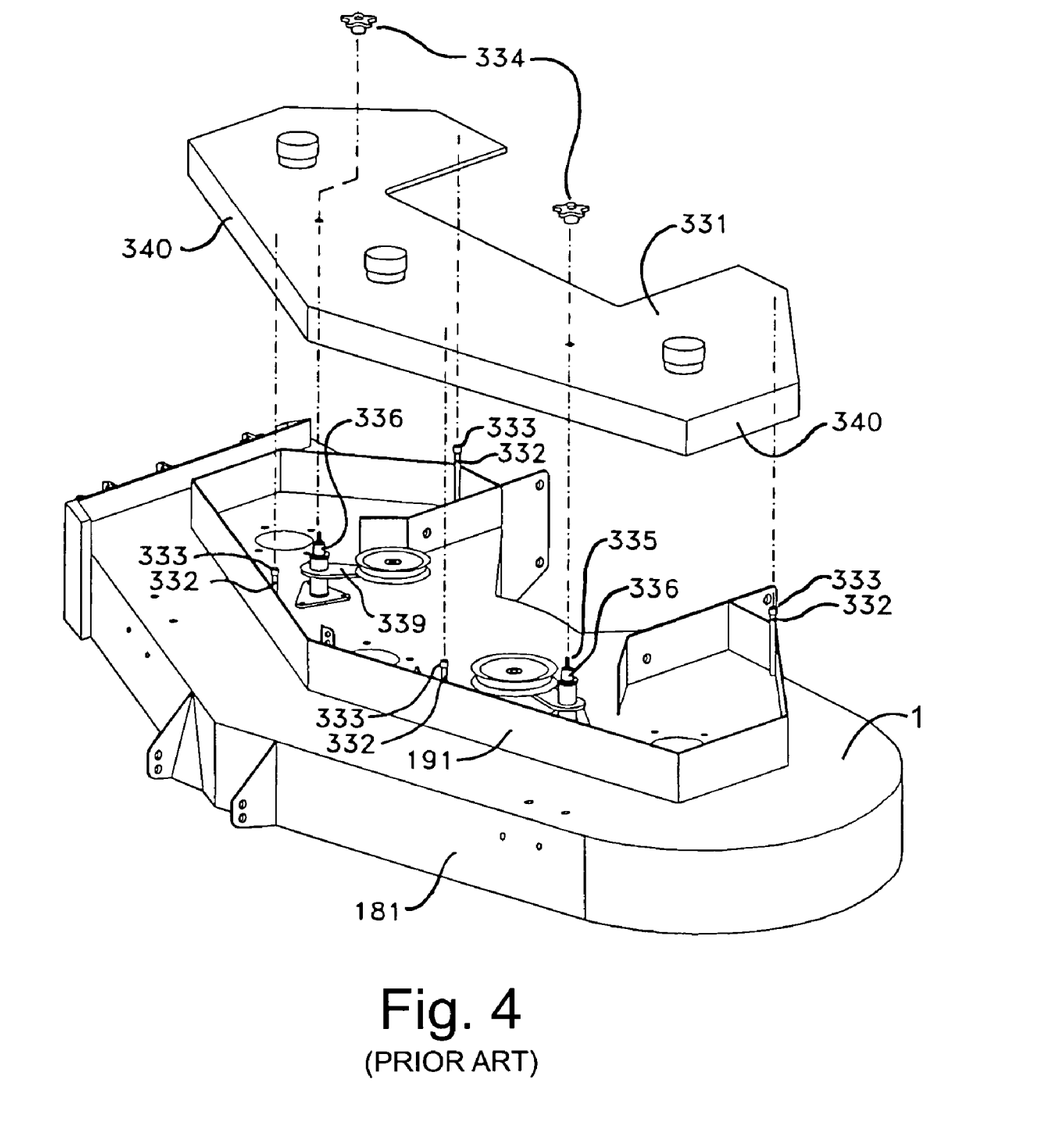
FIG. 4 is a perspective view of a conventional cutter deck of the mower of FIGS. 1-3.

FIG. 4 illustrates the cutter deck 1 and a deck belt cover 331 (including wall 340) for resting thereon. Wall 191 extends from an upper surface of the cutter deck for housing pulleys and the like. This assembly includes cover 331 which rests on post members 332 and caps 333 when knobs 334 are tightened down. Threaded studs 335 are attached into idler pivot pin 336 in order to align cover 331 and knobs 334. Idler arms 339 rotate on pins 336. The tops of idler pivots pins 336 may be slightly lower in elevation than the tops of caps 333.

FIGS. 1-4 have been provided to illustrate general components of an example non-limiting lawn mower. Further details of the structure shown in FIGS. 1-4 may be found in U.S. Pat. No. 6,138,446, the disclosure of which is hereby incorporated herein by reference.

While the aforesaid lawn mowers are desirable for many uses, they can also be improved in certain respects.

BRIEF SUMMARY OF EXAMPLE EMBODIMENTS OF THE INVENTION

This invention relates to a lawn mower. In certain example embodiments of this invention, the lawn mower includes one or more of: (a) a cooling baffle for efficiently cooling a hydraulic fluid tank using air flow caused by a combustion engine used for driving cutting blade(s); (b) improved cockpit structure including fenders; (c) improved drive wheel(s) adjustment structure or assembly; (d) improved idler arm assembly for use in connection with the cutter deck and/or pump driving belt; and/or (e) improved hose routing structure. Example mowers according to this invention may include one of these features (a)-(e), two of these features, three of these features, four of these features, or more of these features in different example embodiments of this invention.

In certain example embodiments of this invention, there is provided a lawn mower comprising: a combustion engine for driving at least one cutting blade for cutting grass, the combustion engine including a flywheel structure at a top portion thereof; first and second hydraulic pumps and corresponding first and second wheel motors, for controlling first and second drive wheels of the mower; a hydraulic fluid tank for holding fluid used in the hydraulic pumps; and a hydraulic fluid tank cooling structure for cooling the tank and/or fluid therein, the cooling structure comprising a baffle located above the flywheel structure of the combustion engine and proximate the hydraulic fluid tank so that rotation of a flywheel of the engine causes air to be sucked into the cooling structure and pass through the cooling structure and across part of the hydraulic fluid tank thereby cooling the tank and/or fluid therein.

In other example embodiments of this invention, there is provided a lawn mower comprising: a combustion engine for driving at least one cutting blade for cutting grass, the combustion engine including a flywheel structure at a top portion thereof; first and second hydraulic pumps and corresponding first and second wheel motors, for controlling first and second drive wheels of the mower; a hydraulic fluid tank for holding fluid used in the hydraulic pumps; and cooling means for cooling the hydraulic fluid tank and/or fluid therein, the cooling means having an air flow passage defined therein and being located above the flywheel structure of the combustion engine so that rotation of a flywheel of the engine causes air to be sucked through the air flow passage of the cooling means and across part of the hydraulic fluid tank thereby cooling the tank and/or fluid therein.

In other example embodiments of this invention, there is provided a lawn mower comprising: an engine for driving at least one cutting blade and/or at least one hydraulic pump, via at least one belt; an idler arm assembly for causing tension in the belt, the idler arm assembly comprising an idler arm, a compression spring that resists compressive force applied thereto, and a rotatable pulley mounted to the idler arm for contacting the belt; and wherein the compression spring is located at least partially between a portion of the idler arm and a fixed support, and biases the idler arm in a direction away from the support in order to cause tension in the belt.

In other example embodiments of this invention, there is provided a lawn mower comprising: a frame including an engine mounting surface, and first and second sidewalls extending at least downwardly from the engine mounting surface, the engine mounting surface of the frame being provided at least partially between the first and second sidewalls of the frame; an engine for driving at least one cutting blade for cutting grass, the engine being mounted on the engine mounting surface of the frame; first and second hydraulic pumps and corresponding first and second wheel motors, the first wheel motor being controlled by the first hydraulic pump, and the second wheel motor being controlled by the second hydraulic pump; at least one hydraulic fluid hose extending between, and communicating with, the first hydraulic pump and the first wheel motor; and wherein the hydraulic fluid hose passes through first and second different spaced apart apertures defined in the frame, in making its way from the first wheel motor to the first hydraulic pump.

In other example embodiments of this invention, there is provided a lawn mower comprising: a frame including an engine mounting surface, and first and second sidewalls extending at least downwardly from the engine mounting surface, the engine mounting surface of the frame being provided at least partially between the first and second sidewalls of the frame; an engine for driving at least one cutting blade for cutting grass, the engine being mounted on the engine mounting surface of the frame; first and second hydraulic pumps and corresponding first and second wheel motors, the first wheel motor being controlled by the first hydraulic pump, and the second wheel motor being controlled by the second hydraulic pump; at least one hydraulic fluid hose extending between the first hydraulic pump and the first wheel motor; and a first wheel motor support that supports the first wheel motor, the first wheel motor support being pivotally mounted to an exterior surface of the first sidewall of the frame, and wherein pivoting of the first wheel motor support causes movement of the first wheel motor so that the height of a drive wheel attached to the first wheel motor can be adjusted relative to the frame so that a cutting height of the mower can be adjusted.

DETAILED DESCRIPTION OF EXAMPLE EMBODIMENTS OF THE INVENTION

Referring now more particularly to the accompanying drawings in which like reference numerals indicate like parts throughout the several views.

In certain example embodiments of this invention, the mower includes a tank for storing hydraulic (or hydro) fluid that is used to drive/control the drive wheel pumps. In certain example embodiments, a baffle-like structure is provided for cooling this hydro tank, and takes advantage of air flow caused by rotation of the flywheel of the mower's combustion engine. In certain example embodiments, the engine's flywheel pulls in air through the baffle to cool off hydro oil tank/reservoir. Thus, in certain example instances, the cooling system may avoid the need for expensive radiator style cooler.

Figure 5:
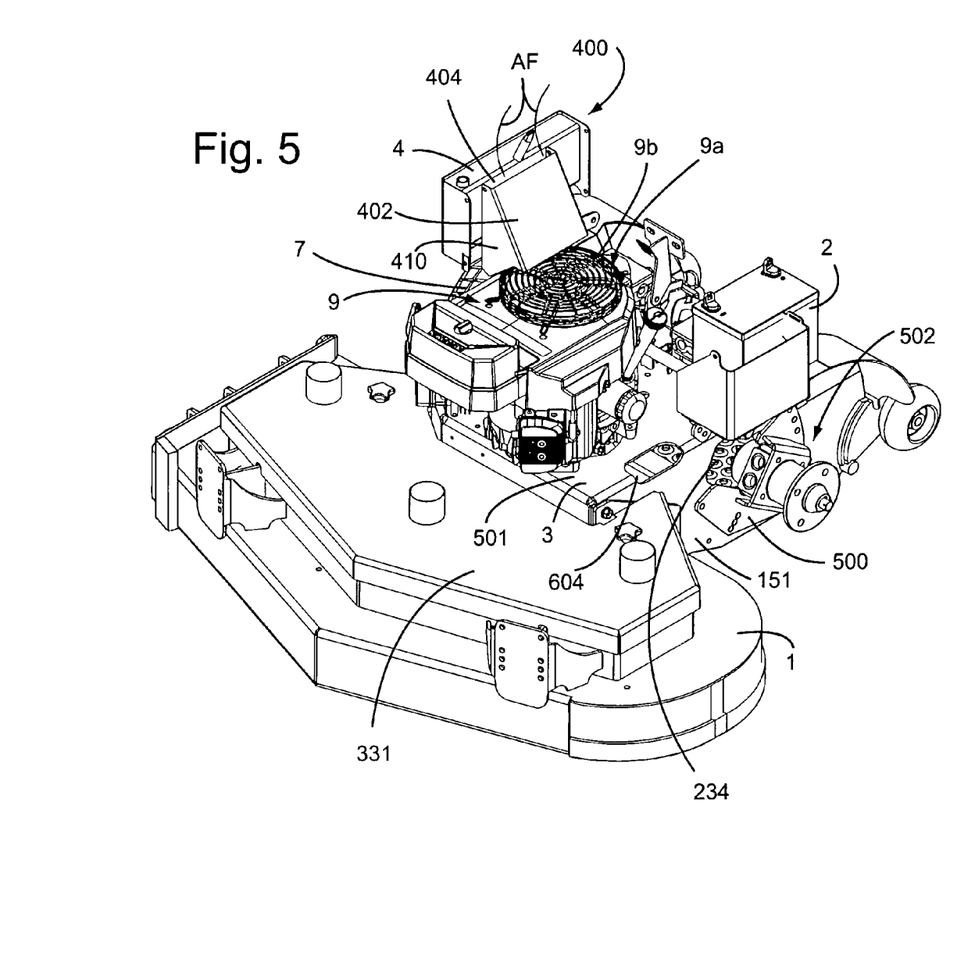
FIG. 5 is a perspective view of part of a lawn mower according to an example embodiment of this invention, including a hydro tank cooling system
Figure 6:
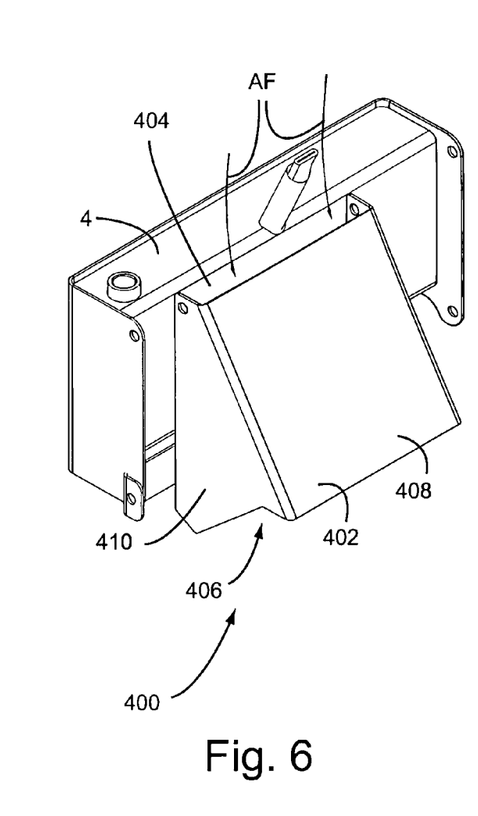
FIG. 6 is an enlarged perspective view of the baffle of FIG. 5.

FIG. 5 is a perspective view of part of a lawn mower according to an example embodiment of this invention. The mower of FIG. 5 may be similar to the mower of FIGS. 1-4, except for the differences illustrated in FIG. 5. FIG. 6 is an enlarged view of the baffle cooling structure used in the FIG. 5 embodiment.

Figure 12:
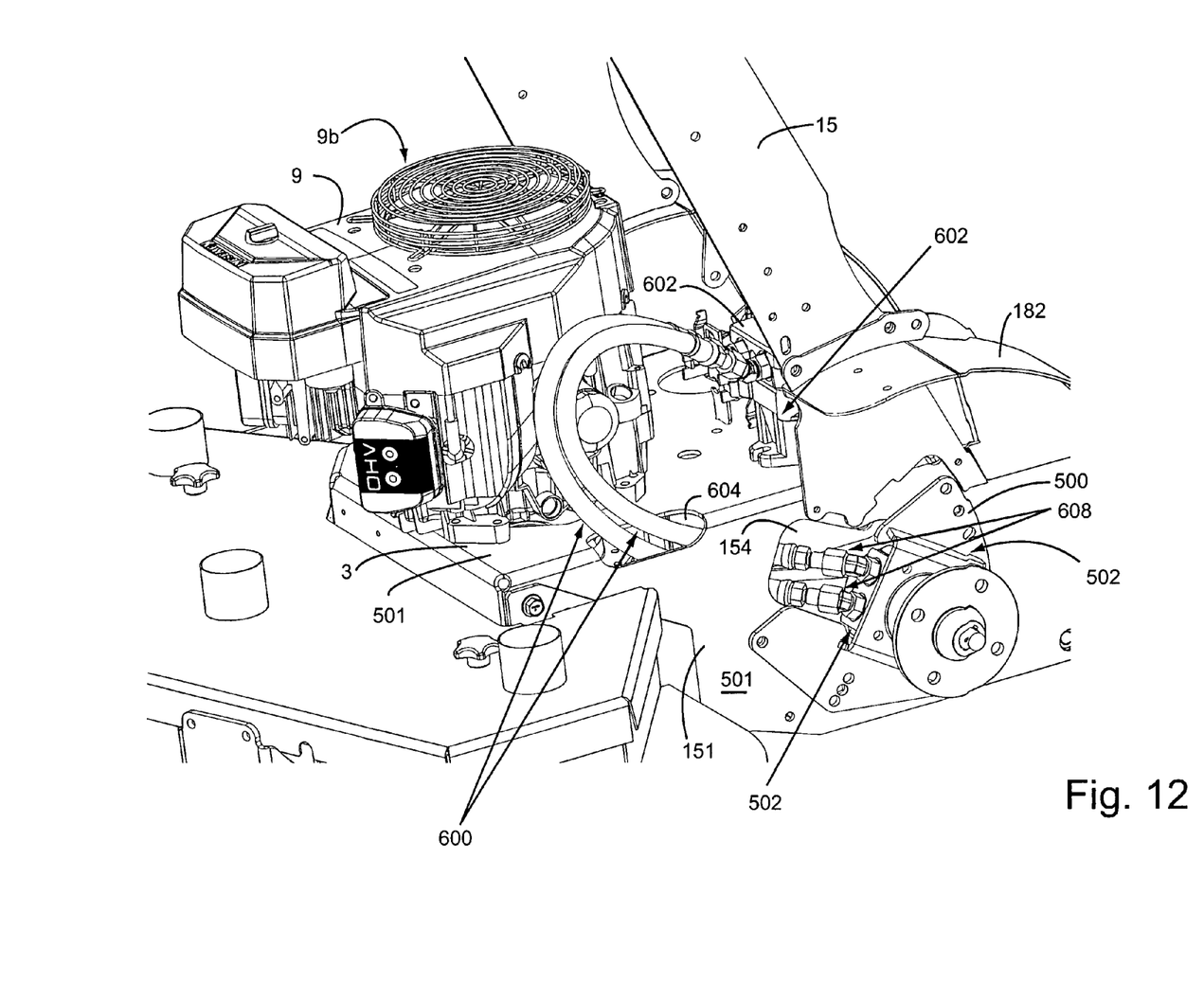
FIG. 12 is a perspective view of part of the mower of FIGS. 5-11, illustrating routing of hydraulic hoses corresponding to one of the wheel motors and one of the hydro pumps.

The mower of FIGS. 5-6 includes combustion engine 9 which includes flywheel structure 9a provided at a top portion thereof. The flywheel structure 9a includes flywheel guard 9b and a flywheel under the guard 9b that rotates when the combustion engine 9 is running. Combustion engine 9 is typically provided at least for driving cutting blade(s) of the lawn mower. The mower also includes, for example, cutter deck 1, battery 2, hydraulic or hydro fluid tank 4, engine deck 3, and so forth. The hydraulic fluid in tank 4 is typically used for cooling fluid for/from the hydraulic pumps that control the driving of the rear drive wheels of the mower (example hydraulic or hydrostatic pumps are shown in FIG. 12). Example hydraulic pumps are described in U.S. Pat. No. 6,782,797, the disclose of which is hereby incorporated herein by reference. Since the engine 9 is mounted on engine deck 3, this surface 3 may also be referred to as an engine mounting surface in certain instances.

In order to prolong operation and/or lifespan of the hydro pumps that control the drive wheels of the mower, it is desirable to keep the hydraulic fluid in tank 4 cooled if possible. FIGS. 5-6 illustrate a hydraulic fluid tank cooling assembly 400 for cooling tank 4 and thus the hydro fluid therein during mower operation. The cooling assembly 400 includes combustion engine 9 which includes flywheel structure 9b, hydraulic fluid tank 4 for holding hydraulic (or hydro) fluid, and cooling baffle 402 mounted above the engine's flywheel structure 9b. Cooling baffle 402 includes a first or top opening 404 which functions as an air input/inlet, and a second or bottom opening 406 which functions as an air output/outlet. Air output opening 406 is located above and preferably over the flywheel structure of the engine 9, and is typically larger in size (area of the opening) than is the air input opening 404. Baffle 402 includes an angled and possibly flat flow directing member 408 as well as a pair of approximately parallel sidewalls 410 on opposite sides of member 408. Flow directing member may be angled from about 10 to 70 degrees (more preferably from about 20 to 60 degrees) relative to the vertical. The air flow channel is defined between sidewalls 410, and also between member 408 and the tank 4. Thus, air flowing through the baffle assembly flows over part of the tank 4 thereby cooling the hydro fluid therein. The shape of the baffle 402 in the figures is provided for purposes of example only, and this invention is not so limited. Any suitable shape of baffle may be used to cause air to flow across part of the tank 4 thereby cooling fluid therein.

Rotation of the engine's flywheel causes air to be sucked into the engine 9 from above the engine. Thus, rotation of the combustion engine's flywheel causes air to be sucked into air input opening 404 of the baffle assembly. The air coming through input 404 flows across part of the tank 4 thereby cooling fluid therein, and then flows out of output opening 406 and into the engine 9 via the flywheel assembly. The reference AF in FIGS. 5-6 illustrates the path of the air flowing into the baffle system for cooling the hydro fluid in tank 4. Thus, the system takes advantages of the engine's air-sucking power to cool the hydro fluid in hydro tank 4. The hydro fluid baffle system may be used in any suitable type of lawn mower, and may be used to cool other types of structures or fluids such as gas in a gas tank, oil in an oil tank, or the like.

Figure 7:
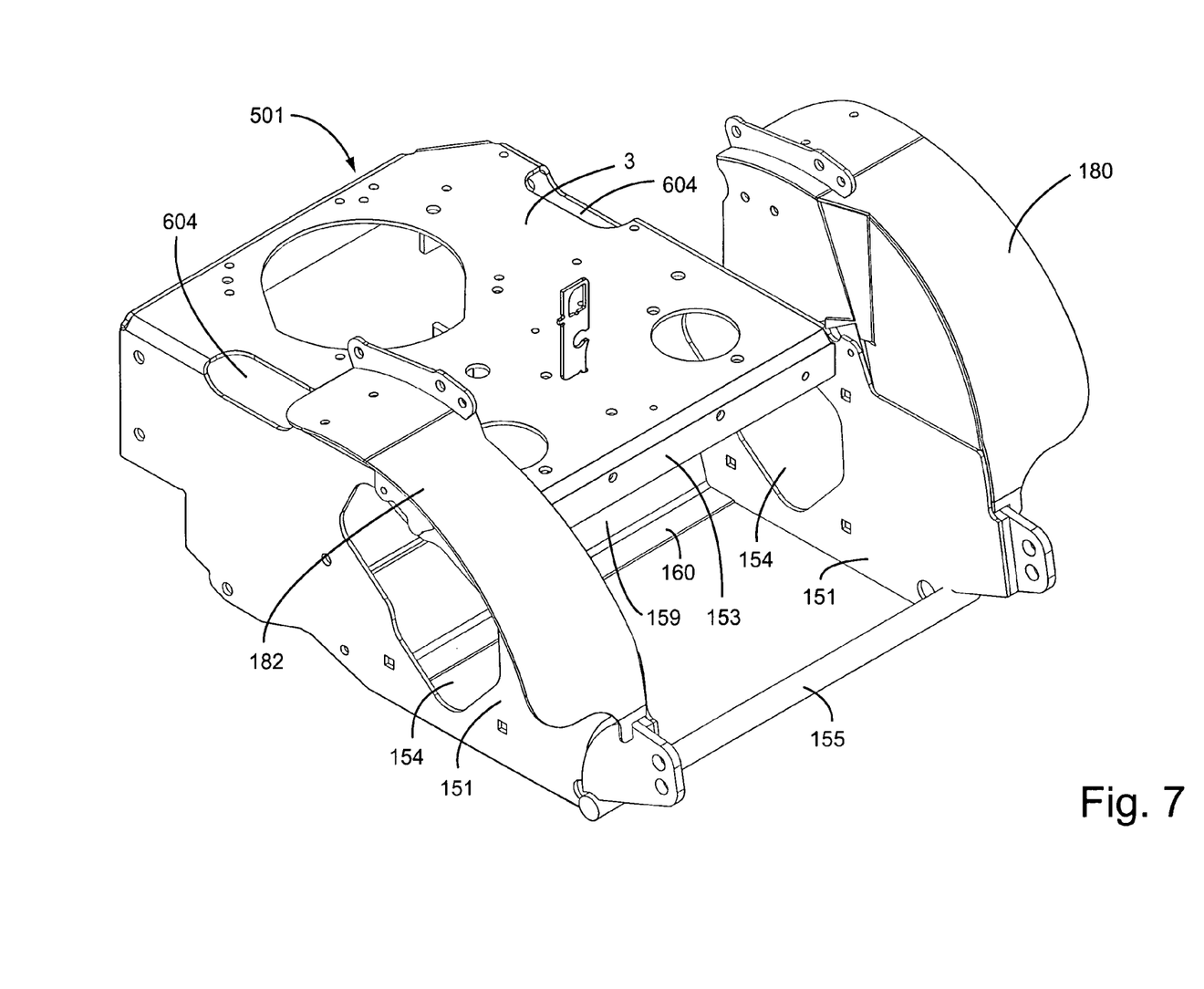
FIG. 7 is a perspective view of an improved tractor frame structure for a stand-on mower according to an example embodiment of this invention.

FIG. 7 is a perspective view of an improved cockpit structure or tractor frame for a stand-on lawn mower according to an example embodiment of this invention. This improved cockpit structure may be used in conjunction with any of the stand-on mowers of U.S. Pat. Nos. 6,138,446, 6,390,225, 6,189,304, 6,438,930, 6,658,831, 6,560,952, and/or 5,964,082, the disclosures of all of which are all hereby incorporated herein by reference, or in any other suitable type of mower. In certain example embodiments, the fenders are used as structural elements to the cockpit sides, and the bar may also help structurally. The use of the fenders permits there to be structure over the tires of the drive wheels which allows space to be used more efficiently. Moreover, vertical or substantially vertical upright supports may be indented over edges of sidewalls.

Referring to FIG. 7, the tractor frame 501 includes engine deck (or engine mounting surface) 3, rigid bar 155, a foot supporting platform 234 for supporting a standing operator during mower operation (not shown in FIG. 7 for purposes of simplicity, but see FIGS. 1 and 5), rest 160 for supporting a front end of the foot supporting platform 234, sidewalls 151, vertical surface 153 representing the rear end of the engine deck, wheel/motor mounting apertures 154 defined in the opposing sidewalls 151 of the tractor frame, rigid channel shaped member 159 disposed between the sidewalls for enclosing the front portion of the foot compartment, right fender 180, and left fender 182. Fenders 180 and 182 may be arc-shaped or curved as shown in FIG. 7, and are provided in a position over at least part of the respective tires of the rear drive wheels of the mower. Sheet metal is typically used to form members 3, 151, 180, 182, 153, 159 and 160. The tractor frame shown in FIG. 7 permits improved space efficiency to be realized, and also permits improved wheel adjustability and hose routing to be realized in certain example instances as will be explained below.

Figure 8A:
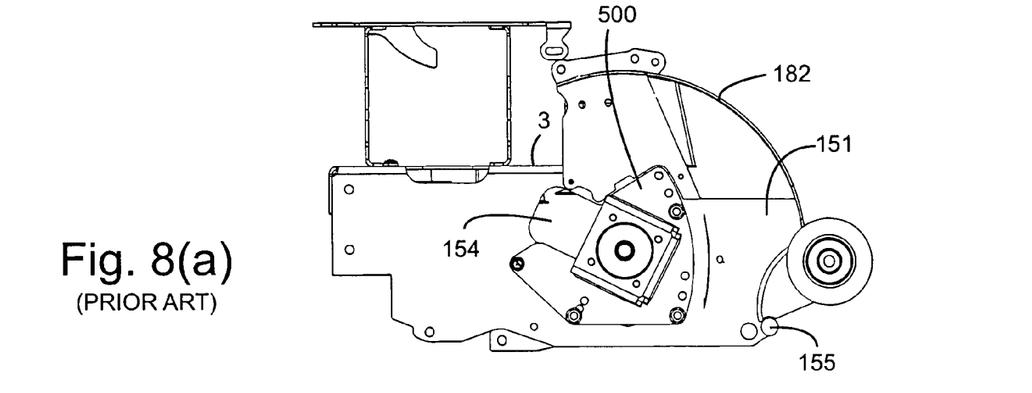
FIGS. 8(a)-(c) illustrate adjustments made to wheel motor height relative to the tractor frame of FIG. 7, in accordance with certain example embodiments of this invention.
Figure 8B:
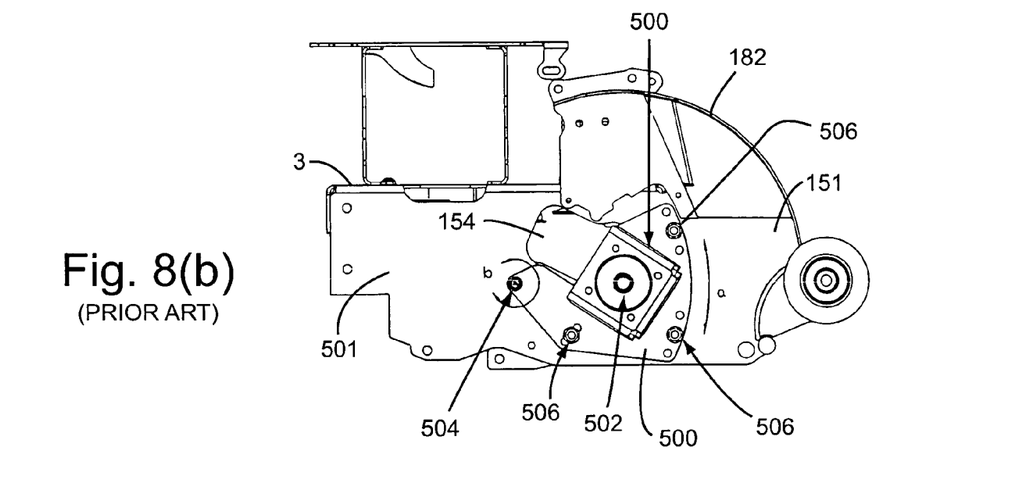
Figure 8C:
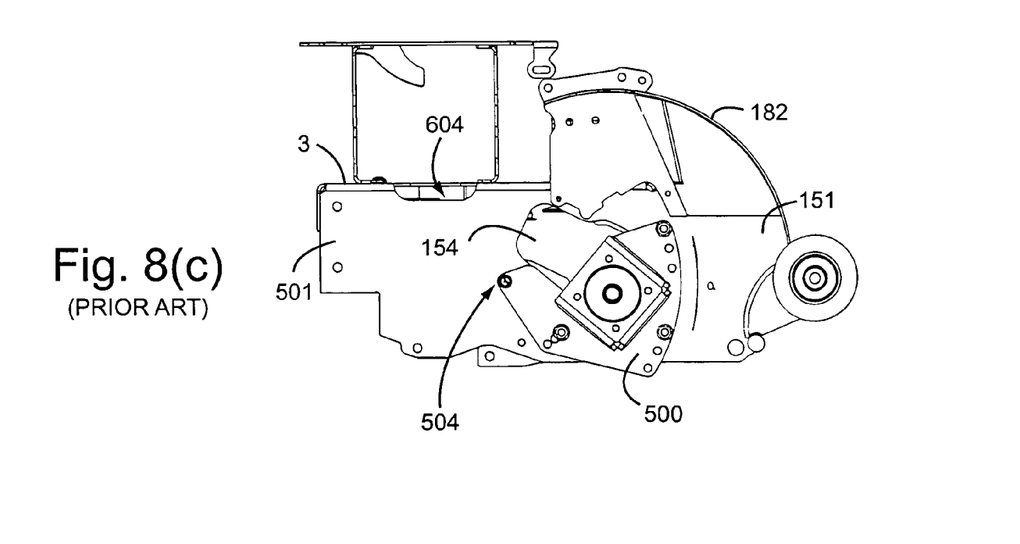
Figure 9:
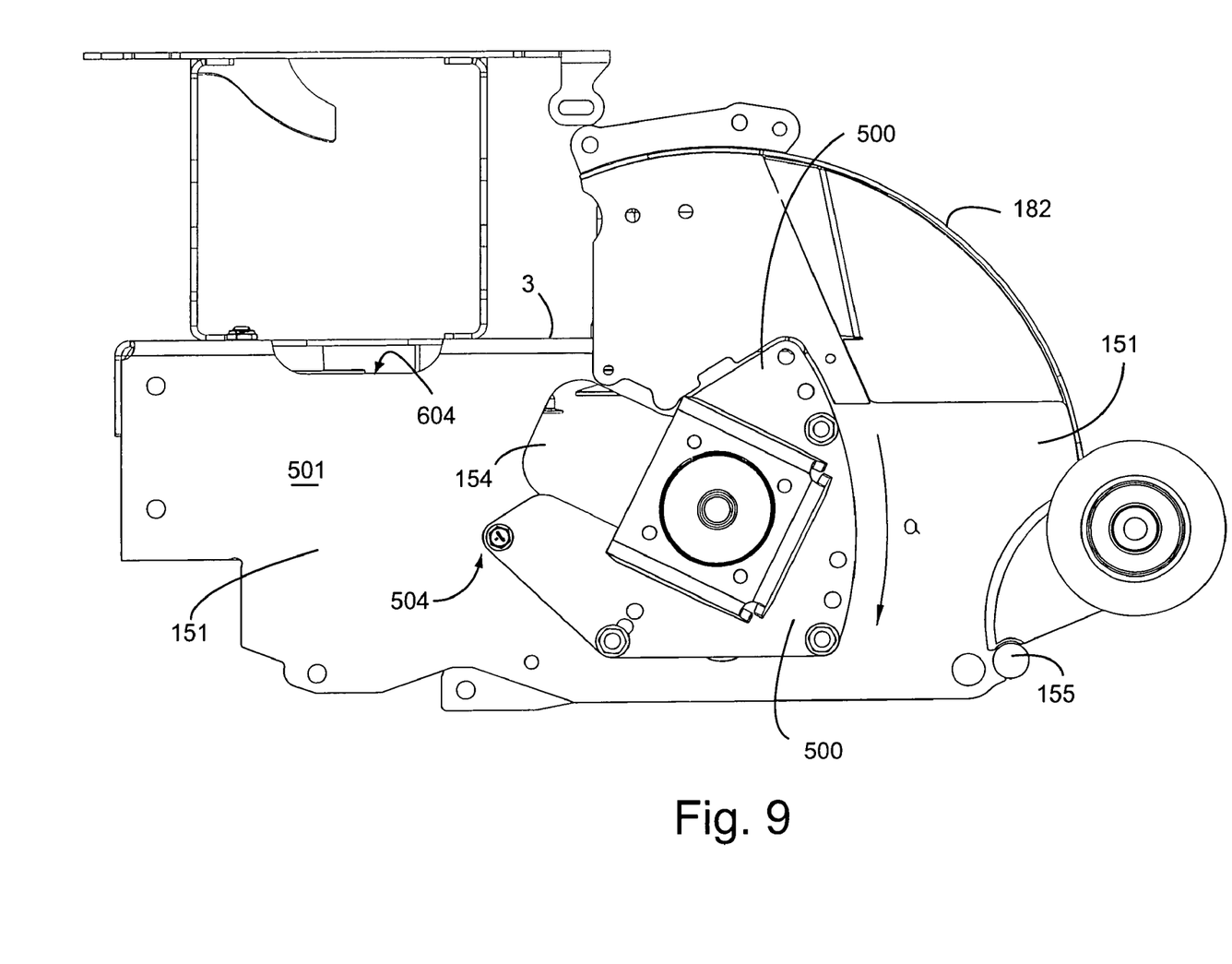
FIG. 9 is an enlargement of FIG. 8(a), and is a side plan view of a tractor frame and a height-adjustable wheel motor according to an example embodiment of this invention, where the wheel motor is adjusted to a relatively low mower cutting height.
Figure 10:
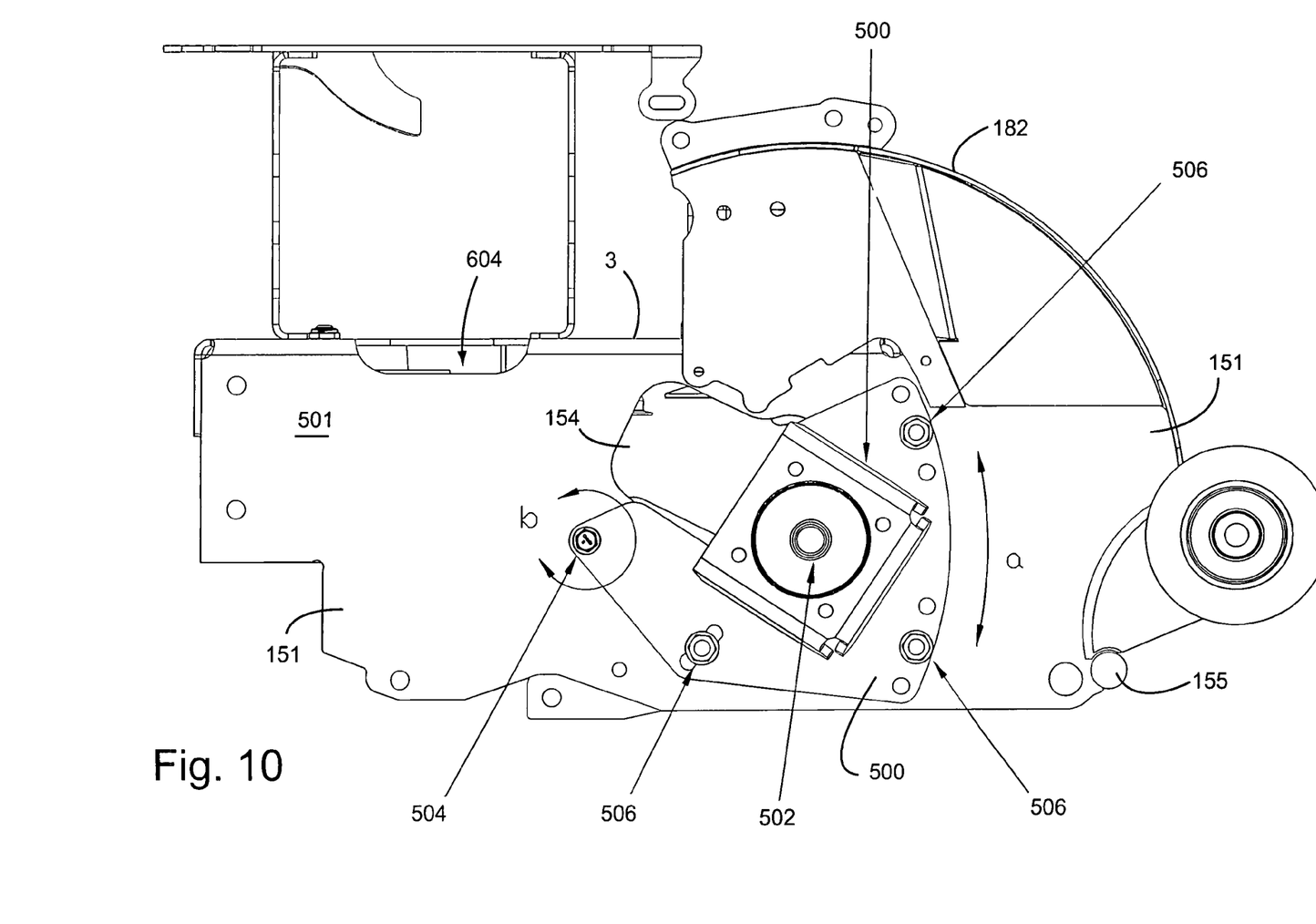
FIG. 10 is an enlargement of FIG. 8(b), and is a side plan view of a tractor frame and a height-adjustable wheel motor according to an example embodiment of this invention, where the wheel motor is adjusted to a medium mower cutting height.
Figure 11:
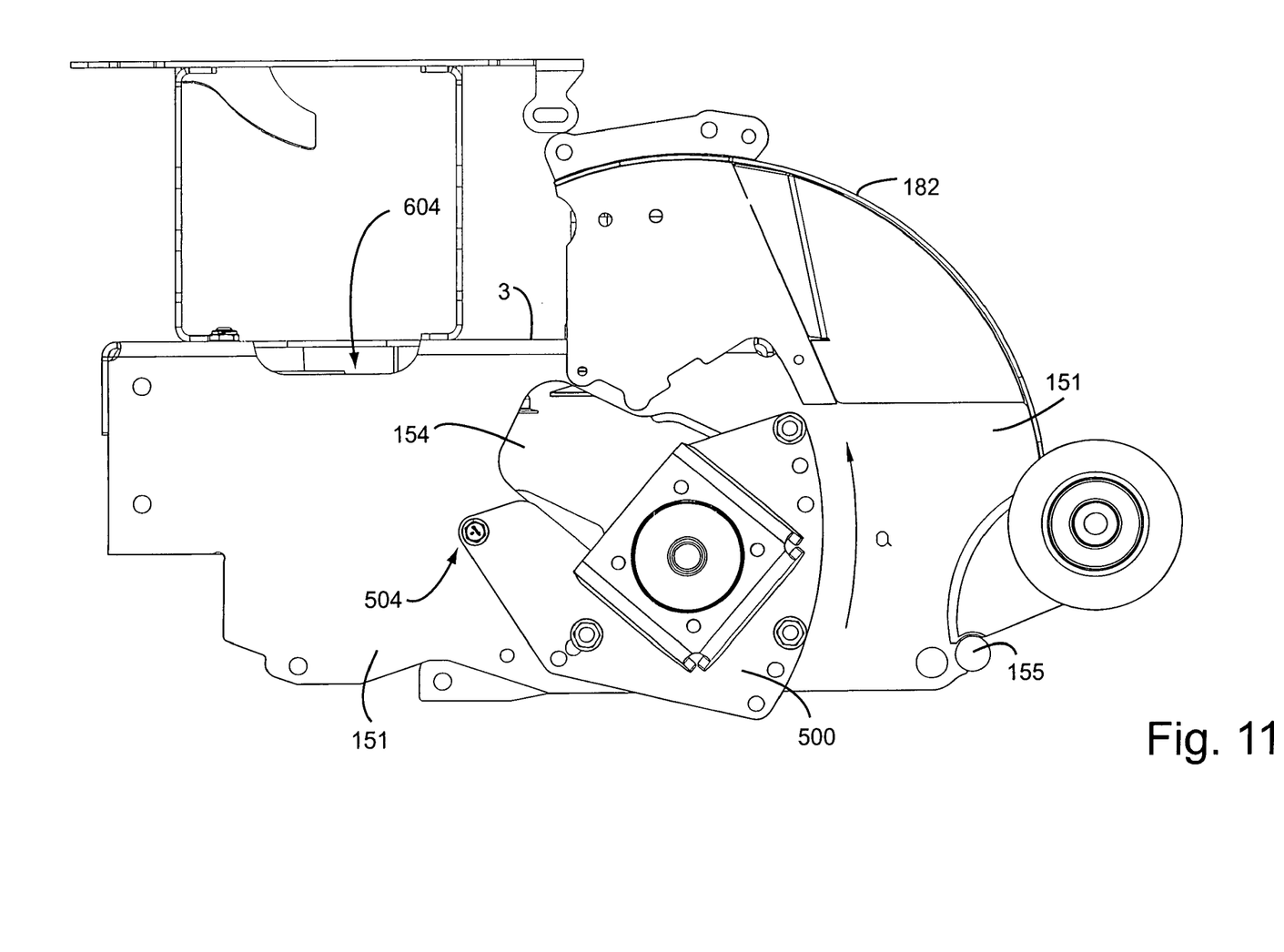
FIG. 11 is an enlargement of FIG. 8(c), and is a side plan view of a tractor frame and a height-adjustable wheel motor according to an example embodiment of this invention, where the wheel motor is adjusted to a relatively high mower cutting height.

FIGS. 8(a), 8(b) and 8(c) illustrate a technique for adjustment of the rear drive wheels 7 according to an example embodiment of this invention. FIG. 9 is an enlarged view of FIG. 8(a), while FIG. 10 is an enlarged view of FIG. 8(b) and FIG. 11 is an enlarged view of FIG. 8(c). The tractor frame 501 of FIGS. 5 and 7 is used in the structure shown in FIGS. 8-11. Improved wheel adjustment and wheel motor hose routing may be realized.

Referring to FIGS. 5 and 7-11, there is provided pivotal drive wheel motor support weldment 500, hydraulically controlled rear drive wheel motor 502, tractor frame 501 that include sidewalls 151 and engine deck 3 and so forth, pivot point or axis 504 where the wheel motor support 500 is pivotally attached to and can pivot with respect to the sidewall 151 of the tractor frame 501, and removable bolts 506 for adjustment of the rear drive wheel 7 height. It will be appreciated that the rear drive wheel motors 502 are provided in and extend through the apertures 154 defined in the sidewalls 151 of the tractor frame 501; and the rear drive wheels 7 are mounted to the respective motors 502 on the exterior sides thereof at least partially under fenders 180, 182. At least part of the wheel motors 502 are located exterior of the respective sidewalls 151 of the tractor frame, as best shown in FIGS. 5 and 8-11. As the drive wheels are adjusted to different positions (e.g., to change the cutting height of the mower), the wheel motors 502 move to different angles and to different positions in their respective apertures 154 as shown in FIGS. 8(a)-8(c). Similar components are provided for the rear drive wheel on the other side of the mower, since only the left rear side of the mower is shown in these figures for purposes of simplicity.

FIGS. 8(a) and 9 illustrate a relative low cutting height of the mower, since pivotal wheel motor support 500 (and thus the corresponding wheel motor 502 and rear drive wheel 7) is at a relatively high elevation relative to the tractor frame 501. In contrast, FIGS. 8(c) and 11 illustrate a relative high cutting height of the mower, since wheel motor support 500 (and thus the corresponding wheel motor 502 and rear drive wheel 7) is at a relatively low elevation relative to the tractor frame 501. Note in FIGS. 8(c) and 11 how part of the pivotal wheel motor support 500 extends downwardly beyond the lowermost edge of the tractor frame 501, which is indicative of a low rear drive wheel position and thus a high cutting height of the mower. FIGS. 8(b) and 10 illustrate a medium cutting height. Reference "a" in FIGS. 8-11 illustrate the up/down arcuate movement of the wheel motor support 500 (and thus of the corresponding wheel motor 502 and drive wheel 7) as the support 500 pivots about axis 504 thereby permitting the wheel height to be adjusted.

Still referring to FIGS. 5 and 7-11, it will be explained how the height of the rear drive wheels 7 can be adjusted (and thus the cutting height of the mower can be adjusted). First, bolts 506 are removed. Then, after bolts 506 that fixedly hold the support 500 to the tractor frame 501 have been removed, and after a pivot bolt at pivot point 504 has been loosened (but not removed), the wheel motor support 500 is pivoted about the pivot axis 504 (see arc-shaped pivoting "a" in FIGS. 8-11) in order to adjust the wheel motor 502 height (and thus the height of the rear drive wheel 7 operatively attached to the motor) relative to the tractor frame 501 thereby adjusting the cut height of the mower. Reference "b" in FIGS. 8-11 illustrate the rotation at pivot 504 between the support 500 and the tractor frame 501.

FIG. 12 illustrates that hydraulic hoses 600 extend from and fluidly communicate between a wheel motor 502 and a corresponding hydro pump that controls that wheel motor. A pair of hoses is provided between each pump 602 and corresponding wheel motor 502. In each pair of hoses, one of the hoses takes hydraulic fluid to the wheel motor from the pump, and the other hose takes hydraulic fluid to the pump from the wheel motor. Thus, in each pair, the first hose carries fluid in one direction whereas the other hose carries fluid in the other direction. The hoses 600 pass through an advantageous aperture 604 defined in the tractor frame 501. This hose aperture in the tractor frame 501 may be located at an intersection between a sidewall 151 and the engine deck 3 portions of the tractor frame, with part of the aperture being provided in each of these two walls as shown in the figures. Two hydro pumps 602 are provided, one of the right rear drive wheel and one for the left rear drive wheel. Referring to FIGS. 8-12, advantageously, the wheel motor 502 through its adjustment locations shown in FIGS. 8-11 moves in an arc (see "a" in FIGS. 8-11) thereby helping to keep high pressure hoses 600 (which extend from the wheel motor 502 to the corresponding hydro pump as shown in FIG. 12) from bunching up against other components or becoming crimped. Accordingly, wheel motor 502 and drive wheel 7 height can be adjusted without substantially changing the height of the mounting of the bottoms of the high pressure hydro hoses 600. The elevation of the hoses 600 (at one or more locations including in the center of the hose and/or at the location where the hose is mounted to the motor) does not move as much as the elevation of the wheel motor when the motor's height is adjusted (this is because the wheel motor is further out on the pivot axis). Moreover, in certain example embodiments, the hoses 600 extend outwardly from the corresponding wheel motor 502 at the mounting area at an angle of from about 5 to 80 degrees from vertical (more preferably from about 10 to 70 degrees, and most preferably from about 10 to 60 degrees). Thus, the hoses 600 do not extend from the motor in a vertical direction, and thus are less subject to crimping and other types of damage thereby extending the life of the hoses. As shown in FIG. 12, hydraulic fittings 608 couple the hoses 600 to the corresponding wheel motor 502.

In certain example embodiments, as best shown in FIG. 12, the hydraulic hoses 600 extend first through aperture 154 defined in sidewall 151 of the tractor frame 501 to the interior of the frame thereby allowing tires of the rear drive wheels to be closer to the tractor frame; then, the hoses 600 extend back to the exterior of the tractor frame by way of aperture 604 defined in the tractor frame 501 to the corresponding pump 602. Thus, in certain example embodiments, there are two holes (or apertures) 154 and 604 in tractor frame 501 through which the hoses 600 pass, one hole or aperture 154 being in the sidewall 151 of the tractor frame 501 and the other aperture 604 being in the sidewall and/or top wall of the tractor frame 501. The flow of fluid of the hose is thus improved and wheel adjustment made more efficient, in that the hoses 600 extend from outside to the hollow interior of the tractor frame 501, and the back through sidewall and/or top wall of tractor frame to outside the tractor frame going toward the corresponding pump 602. Of course, there are a pair of such hoses 600 (and apertures) on each side of the mower, since two pumps 602, two wheel motors 502, and two rear drive wheels 7 are provide for the mower.

Figure 13:
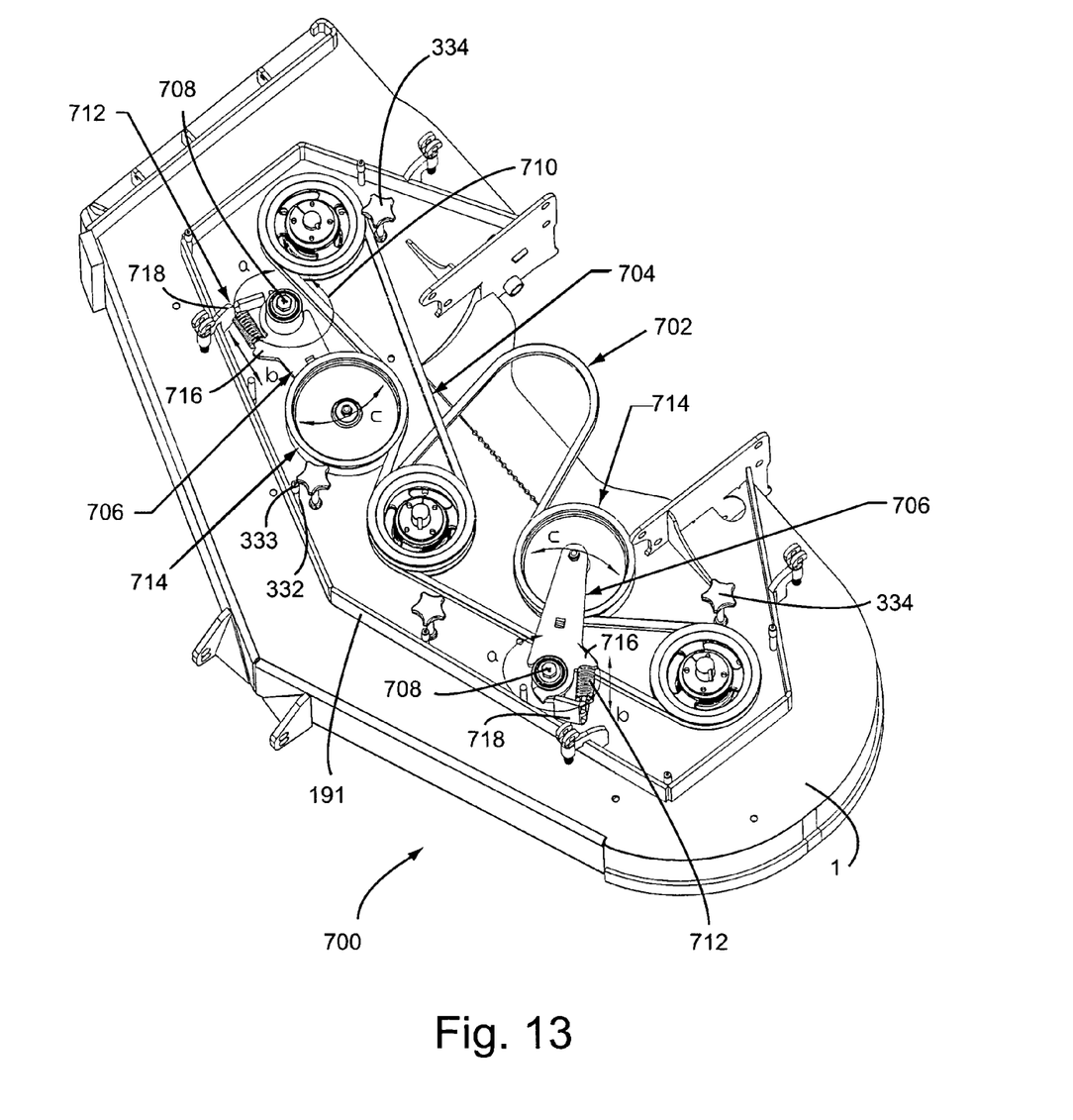
FIG. 13 is a perspective top view of the cutter deck assembly, including idler arms for belt tensioning, according to an example embodiment of this invention.
Figure 14:
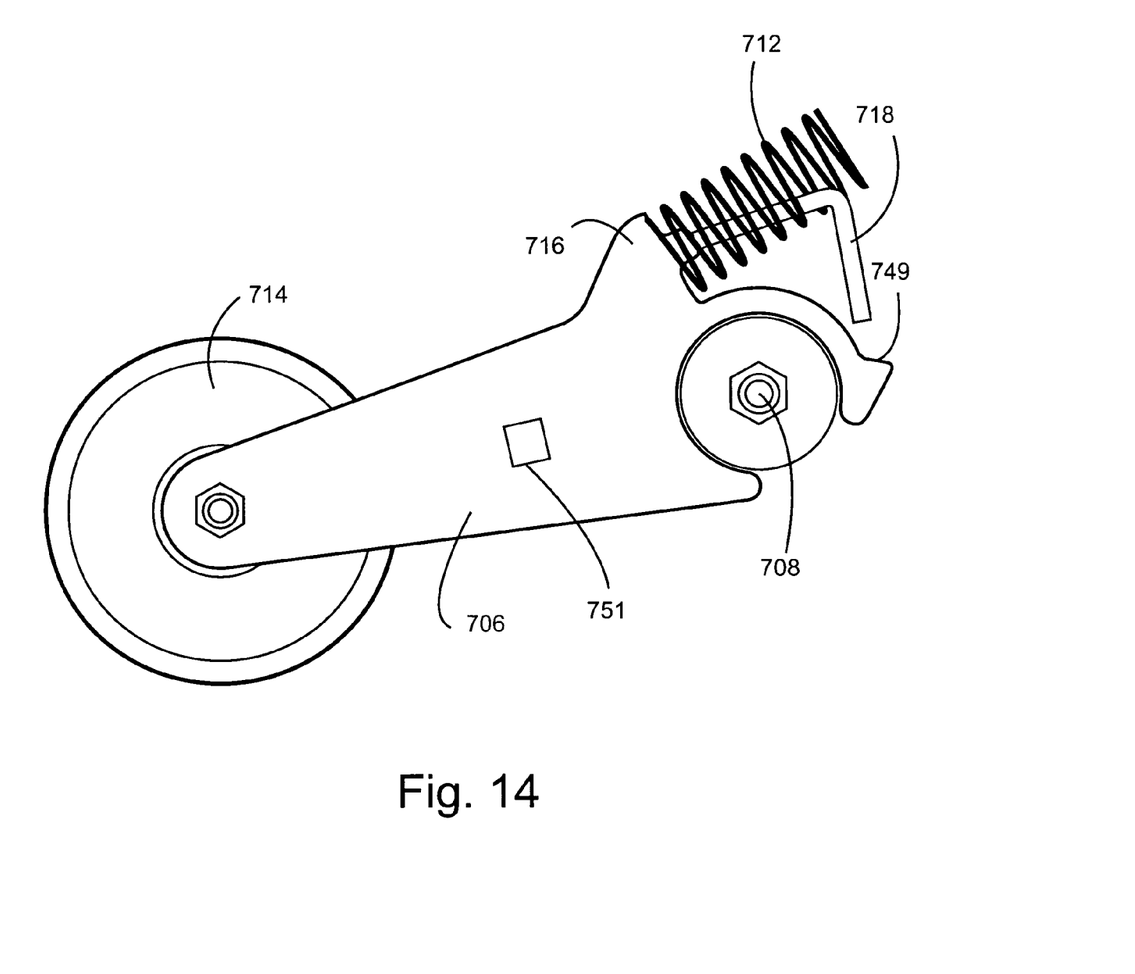
FIG. 14 is an enlarged top plan view of an idler arm assembly of FIG. 13.

FIG. 13 is a top view of a cutter deck assembly 700 according to an example embodiment of this invention. This cutter deck assembly may be used in connection with any mower discussed herein, or any other type of mower, in certain example instances. FIG. 14 is a close-up top view of a die spring idler arm of FIG. 13.

Referring to FIGS. 13-14, the cutter deck assembly is for driving cutting blade(s) (not shown) under the cutter deck in order to cut grass. FIG. 14 is an enlarged view of an idler arm assembly of the FIG. 13 embodiment. The cutter deck assembly 700 includes cutter deck 1 below which the cutting blades are located, wall 191 extending from an upper surface of the cutter deck for housing pulleys, serpentine drive belt 702 (primary blade drive belt), drive belt 704 (secondary blade drive belt), and the like, and a cover (not shown, see FIG. 4) which rests on post members 332 and caps 333 when knobs 334 are tightened down. Belt tensioning idler arm 706 pivots about pivot axis 708 as shown at 710, and bias is provided on the arm by die spring 712. Rotatable pulley 714 is attached to an end portion of idler arm 706. Two such idler arms 706, and thus two corresponding pulley 714 and springs 712, are provided in certain example instances, one set for each belt, as shown in FIG. 13. Also, it is noted that this idler arm assembly may be used in connection with the belts for driving the blades in the cutter deck assembly, or alternatively in connection with belts for driving the hydro pumps.

Still referring to FIGS. 13-14, a purpose of the idler arm assembly in the cutter deck assembly is to create belt tension to keep belts 702 and 704 tight in the cutter deck housing (and/or hydro system if applicable). Instead of using an "extension" spring, "compression" springs 712 are used in certain example embodiments of this invention. In certain example embodiments, compression spring(s) 712 act directly on the pivoting arm 706, and is located between a protrusion 716 of the arm and a rigid fixture 718 welded to cutter deck. Compression springs resist compressive force applied approximately axially. Thus, with respect to the uppermost spring 712 shown in FIG. 13, the compression spring 712 resists being compressed and thereby biases idler arm 706 (and the pulley 714 rotatably attached thereto) counterclockwise as shown in the figure to keep belt 704 taut. The other idler arm assembly works in a similar manner. Thus, FIG. 13 depicts rotation of the belt tension idler arm 706 about pivot point 708 (see "a" in FIG. 13), movement of the belt tension idler die spring 712 upon compression and extension (see "b" in FIG. 13), and movement of the belt tension idler pulley 714 in an arc-shaped path as belt tension idler arm 706 moves about pivot 708 (see "c" in FIG. 13). One, two or more arms may be used in different types of mowers.

Advantageously, the idler arm system of FIGS. 13-14 takes up little space and is very efficient. Die springs (using flat bars instead of round wire) of chrome vanadium may be used as springs 712 in certain example embodiments, as these springs are very strong. These strong springs are positioned close to the corresponding pivot point 708 where not a lot of motion of the spring is required. Such springs can be positioned close to the pivot point and still provide good functionality, whereby the compressed and compact structure is taken advantage of. Thus, a tiny and light-weight system can be provided, and can better fit between other components. It is noted that in certain example embodiments, the pivot may have ball bearings in it. It is also noted that in FIG. 14 the spring 712 is not in its operational position relative to 718 (during operation, the spring 712 is more compressed and is inside of rigid fixture 718 as shown in FIG. 13).

Rigid fixture 718 is welded to the cutter deck, and is not part of idler arm 706. In FIG. 14, stop portion 749 functions to hit fixture 718 if the arm 706 rotates too far. Thus, for example, if the belt breaks and/or stretches beyond a reasonable limit, stop 749 prevents the pulley from interfering with other moving parts. Also, on certain decks, stop 749 functions to prevent the arm from rotating to an extent far enough to lose the spring 712. Aperture 751 in arm 706 is for receiving a standard half-inch drive wrench or breaker bar in order to move the idler arm 706 against the biasing spring 712 or to compress the spring (e.g., to remove the belt).

While the inventions have been described in connection with what is presently considered to be the most practical and preferred embodiment, it is to be understood that the inventions are not to be limited to the disclosed embodiments, but on the contrary, are intended to cover various modifications and equivalent arrangements included within the spirit and scope of the appended claims.

The invention claimed is:

1. A lawn mower comprising:
    a combustion engine for driving at least one cutting blade for cutting grass, the combustion engine including a flywheel structure at a top portion thereof;
    first and second hydraulic pumps and corresponding first and second wheel motors, for controlling first and second drive wheels of the mower;
    a hydraulic fluid tank for holding fluid used in the hydraulic pumps; and
    a hydraulic fluid tank cooling structure for cooling the tank and/or fluid therein, the cooling structure comprising a baffle located above the flywheel structure of the combustion engine and proximate the hydraulic fluid tank so that rotation of a flywheel of the engine causes air to be sucked into the cooling structure and pass through the cooling structure and across part of the hydraulic fluid tank thereby cooling the tank and/or fluid therein.

2. The lawn mower of claim 1, wherein the mower is a stand-on lawn mower including a foot platform for supporting a standing operator, and wherein the pumps and wheel motors can cause the mower to perform zero radius turns.

3. The lawn mower of claim 1, wherein the cooling structure including an air inlet and an air outlet, wherein the air outlet is closer to the flywheel structure of the combustion engine than is the air inlet, and wherein the air outlet is larger than the air inlet.

4. The lawn mower of claim 1, wherein the baffle comprises a flow directing member and a pair of approximately parallel sidewalls on opposite sides of the flow directing member.

5. The lawn mower of claim 4, wherein the flow directing member is angled from about 10 to 70 degrees relative to the vertical.

6. The lawn mower of claim 4, wherein the flow directing member is angled from about 20 to 60 degrees relative to the vertical.

7. The lawn mower of claim 1, wherein the cooling structure is mounted to a side of the hydraulic fluid tank.

8. A lawn mower comprising:
    a combustion engine for driving at least one cutting blade for cutting grass, the combustion engine including a flywheel structure at a top portion thereof;
    first and second hydraulic pumps and corresponding first and second wheel motors, for controlling first and second drive wheels of the mower;
    a hydraulic fluid tank for holding fluid used in the hydraulic pumps; and
    cooling means for cooling the hydraulic fluid tank and/or fluid therein, the cooling means having an air flow passage defined therein and being located above the flywheel structure of the combustion engine so that rotation of a flywheel of the engine causes air to be sucked through the air flow passage of the cooling means and across part of the hydraulic fluid tank thereby cooling the tank and/or fluid therein.

9. The lawn mower of claim 8, wherein the cooling means includes an air inlet and an air outlet, wherein the air outlet is closer to the flywheel structure of the combustion engine than is the air inlet, and wherein the air outlet is larger than the air inlet.

10. The lawn mower of claim 8, wherein the cooling means is mounted to a side of the hydraulic fluid tank.

* * * * *